(12) United States Patent
Turner, Jr. et al.

(10) Patent No.: US 9,289,867 B2
(45) Date of Patent: Mar. 22, 2016

(54) METHOD OF LEVELING A SCOPE

(71) Applicant: Talley Mfg., Inc., Santee, SC (US)

(72) Inventors: Gary E. Turner, Jr., Summerville, SC (US); Ronald J. Shaffer, Jr., Yemassee, SC (US)

(73) Assignee: Talley Mfg., Inc., Santee, SC (US)

( * ) Notice: Subject to any disclaimer, the term of this patent is extended or adjusted under 35 U.S.C. 154(b) by 0 days.

(21) Appl. No.: 14/337,980

(22) Filed: Jul. 22, 2014

(65) Prior Publication Data

US 2015/0239080 A1 Aug. 27, 2015

Related U.S. Application Data

(63) Continuation of application No. 13/736,638, filed on Jan. 8, 2013, now abandoned.

(51) Int. Cl.
| | |
|---|---|
| *F41G 1/387* | (2006.01) |
| *B23P 19/10* | (2006.01) |
| *F41G 11/00* | (2006.01) |
| *B23P 19/04* | (2006.01) |
| *F41G 1/54* | (2006.01) |

(52) U.S. Cl.
CPC ............... *B23P 19/10* (2013.01); *B23P 19/04* (2013.01); *F41G 1/54* (2013.01); *F41G 11/003* (2013.01); *Y10T 29/49895* (2015.01)

(58) Field of Classification Search
CPC ............. F41G 1/16; F41G 1/38; F41G 1/387; F41G 1/40; F41G 1/41; F41G 1/44; F41G 1/545; F41G 11/001; F41G 1/54; F41G 11/003

USPC .............. 42/90, 111, 115, 119, 124, 125
See application file for complete search history.

(56) References Cited

U.S. PATENT DOCUMENTS

| | | | | |
|---|---|---|---|---|
| 2,193,302 | A | * | 3/1940 | Stith .............................. 42/126 |
| 2,517,274 | A | * | 8/1950 | Baker et al. .................... 42/127 |
| 2,657,465 | A | * | 11/1953 | Lloyd ............................ 42/129 |
| 3,513,549 | A | * | 5/1970 | Smiley ........................... 42/126 |
| 4,085,511 | A | * | 4/1978 | Kovac ............................ 42/126 |
| 4,531,321 | A | * | 7/1985 | Bechtel ......................... 42/126 |
| 4,862,624 | A | | 9/1989 | Williams |
| 5,033,219 | A | * | 7/1991 | Johnson et al. ................ 42/115 |
| 5,425,191 | A | | 6/1995 | Taylor et al. |
| 5,435,091 | A | * | 7/1995 | Toole et al. .................... 42/117 |
| 5,926,964 | A | | 7/1999 | Korapaty |
| 6,594,938 | B2 | | 7/2003 | Horton |
| 8,240,075 | B1 | * | 8/2012 | Mullin ........................... 42/125 |
| 2003/0154641 | A1 | | 8/2003 | Stover |
| 2003/0192224 | A1 | * | 10/2003 | Kirk .............................. 42/124 |

(Continued)

*Primary Examiner* — Bret Hayes
(74) *Attorney, Agent, or Firm* — Finnegan, Henderson, Farabow, Garrett & Dunner, L.L.P.

(57) ABSTRACT

A scope mount for a firearm is disclosed. The scope mount may include a first ring component covering a first portion of an upper half of a scope body, and a second ring component covering a second portion of the upper half of the scope body. The scope mount may also include a third ring component covering a first portion of a lower half of the scope body, and a fourth ring component covering a second portion of the lower half of the scope body. The first and second ring components may removably attach to the third and fourth ring components, respectively, and may form at least two rings around the scope body. The third and fourth ring components may be integral with a scope mount base, and the scope mount base may be configured to removably attach to a Picatinny rail.

18 Claims, 8 Drawing Sheets

(56) References Cited

U.S. PATENT DOCUMENTS

| | | | |
|---|---|---|---|
| 2006/0137234 A1* | 6/2006 | Castagnozzi | ............ 42/124 |
| 2011/0088306 A1* | 4/2011 | Nasef | ............ 42/136 |
| 2012/0174462 A1 | 7/2012 | Spuhr | |

* cited by examiner

METHOD OF LEVELING A SCOPE

This application is a continuation of U.S. patent application Ser. No. 13/736,638, filed Jan. 8, 2013. The entire contents of the above application are expressly incorporated herein by reference.

TECHNICAL FIELD

The present disclosure relates generally to a scope mount and, more particularly, to a scope mount for a firearm.

BACKGROUND

A firearm scope, typically, is mounted on a firearm via a scope mount, and is used to enhance a firearm operator's ability to accurately fire a direct shot at a desired target. Movement, or slippage, of the scope within the scope mount must be restricted in order to maintain the scope's alignment with the firearm. Slippage of the firearm-mounted scope may occur when a firearm is fired and the subsequent backward recoil of the firearm causes the scope to shift forward or to either side within the mount if the scope's fit within the mount is not adequately secure. Scope slippage may also result from rough handling of the firearm on account of the firearm operator's activity and/or movements. Conventional scope mounts for firearms include mechanisms designed to restrict, and/or otherwise limit, movement of the scope during the transport and use of the firearm.

Many conventional scope mounts are designed to fit a variety of scopes as well as mount to a variety of firearms. Under such circumstances, a single scope mount may be used for a variety of firearms and scopes owned and/or utilized by a firearm operator. Such a universal-type scope mount presents a cost savings benefit and provides a measure of relative convenience for owners/operators of multiple firearms who wish to own and utilize only one scope mount. Although such universal-type scope mounts may fit a number of scopes and firearms reasonably well, such scope mounts may not fit any one scope and firearm very well. Such a compromised scope fit within a scope mount may be sufficient in some situations; however, in other situations such a fit is inadequate.

The disclosed scope mount is directed to overcoming one or more of the problems set forth above.

SUMMARY

Military and law enforcement personnel regularly utilize relatively heavy firearms which are often equipped with relatively heavier scopes. Such relatively heavier firearms create greater tendencies for scope slippage of the attached relatively larger scopes. For example, larger firearms experience more significant amounts of recoil upon firing. The increased recoil exerted on relatively more substantial scopes puts more strain on scope mounts than would otherwise be experienced. Such increased strain on a scope mount that is not very well-fitted to the attached scope has an increased likelihood of scope slippage.

Adding to the increased likelihood of scope slippage on account of the increased size of the firearm, scope, and firearm recoil is the fact that military and law enforcement personnel often fire their firearms in rapid succession. In either training or active duty situations, such personnel may fire their firearms in rapid succession for extended periods of time. The collective effect on the scope mount-scope fit from successively fired shots, over prolonged periods of time, can be significant, and can cause scope slippage in situations where the scope is not very well fitted into a scope mount.

Additionally, given the physical activities of such personnel, the firearms of such personnel may be regularly exposed to rough handling and harsh conditions. Such personnel may need to utilize their firearms as battering rams, as shields, as levers, and/or in any other makeshift manner. Such rough handling of firearms adds additional strain on the scope/scope mount fit, and increases the likelihood of a less-than very well-fitted scope/scope mount apparatus encountering scope slippage.

In these circumstances, where scope slippage has an enhanced likelihood of occurring, it is crucial that scope slippage not occur, and that such personnel maintain accurate scope/firearm alignment. Such personnel rely on the accuracy of their firearm scopes in life and death and/or other relatively high stakes situations. In some of these high stakes situations military and law enforcement personnel may need to accurately fire upon targets exceeding 2,000 meters in distance from where the shots are fired. It is of particular importance in such long-range targeting that a firearm's scope remain accurately aligned to the firearm because even the slightest deviation from adequate scope/firearm alignment can result in a failed objective.

In one aspect, the present disclosure is directed to a scope mount for a firearm. The scope mount may include a first ring component covering a first portion of an upper half of a scope body, and a second ring component covering a second portion of the upper half of the scope body. The scope mount may also include a third ring component covering a first portion of a lower half of the scope body, and a fourth ring component covering a second portion of the lower half of the scope body. The first and second ring components may removably attach to the third and fourth ring components, respectively, and may form at least two rings around the scope body. The third and fourth ring components may be integral with a scope mount base.

In another aspect, the present disclosure is directed to a scope mount for a firearm. The scope mount may include a first ring component covering a first portion of an upper half of a scope body, and a second ring component covering a second portion of the upper half of the scope body. The scope mount may also include a third ring component covering a first portion of a lower half of the scope body, and a fourth ring component covering a second portion of the lower half of the scope body. The first and second ring components may removably attach to the third and fourth ring components, respectively, and may form at least two rings around the scope body. The third and fourth ring components may be integral with a scope mount base, and the scope mount base may be removably attached to a plurality of attachment points on the firearm.

In another aspect, the present disclosure is directed to a method of leveling a scope. The method may include providing a leveling shim fitted for a leveling surface on the base of a scope mount, and enabling a user to orient a scope placed in the scope mount such that an underside of the scope rests on the leveling shim when portions of the scope rest on a first set of at least two ring components. The method may further include providing a second set of at least two ring components for placement on top of the inserted scope such that when the first set of ring components is aligned with the second set of ring components at least two complete rings surrounding the scope are formed. The method may additionally include providing a means of securing the first and second sets of ring components surrounding the scope.

DETAILED DESCRIPTION

Figure 1:
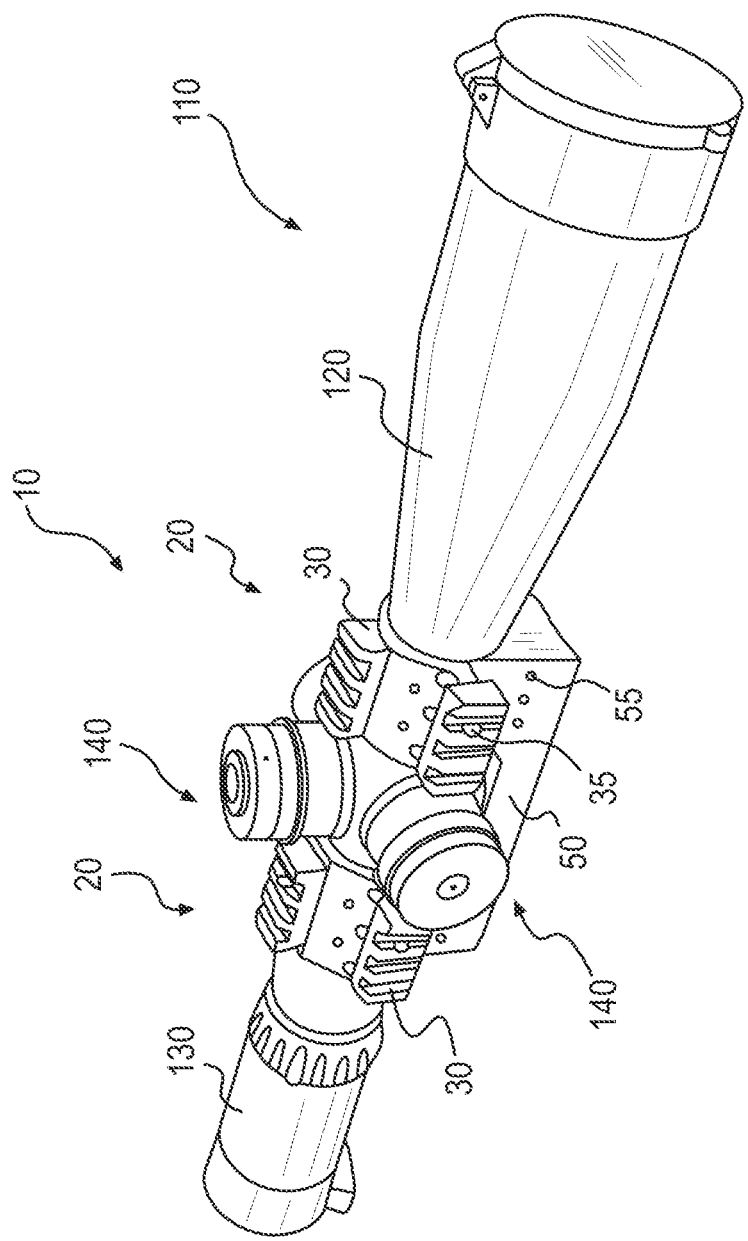
FIG. 1 is a diagrammatic illustration of an exemplary disclosed scope mount fitted to a scope.

An exemplary scope mount 10 is illustrated in FIG. 1. Scope mount 10 is depicted and described as a scope mount designed for a rifle. However, it is contemplated that scope mount 10 may be utilized with any firearm including any long gun and/or hand gun such as, for example, any rifle, shot gun, muzzleloader, revolver or pistol. Scope mount 10 may be manufactured of aircraft-grade aluminum or any other metal, alloy, amalgamation, plastic or substance known in the art. Scope mount 10 may be anodized and provided with a nonreflective finish. Scope mount 10 may be designed to house, and/or otherwise fit, scope 110.

Scope 110 is depicted and described as a refracting telescopic sighting device. However, it is contemplated that scope 110 may include any sighting device such as, for example, a reflector sight and/or a laser sight. Scope 110 may include an objective bell 120 and an ocular bell 130. Objective bell 120 may house various optical elements designed to collect and focus light. Ocular bell 130 may include optical elements designed to further focus and magnify the images targeted by scope 110. Scope 110 may further include adjustment controls manually manipulated by turrets 140. Turrets 140 may provide opportunity to regulate focusing control, elevation or vertical adjustment, windage or horizontal adjustment, as well as adjustments for magnification, illumination, parallax compensation, etc. While housing scope 110, scope mount 10 may afford unfettered access to turrets 140 and/or other control aspects and features of scope 110.

As shown in FIG. 1, scope mount 10 may include a plurality of removable rails 30 fastened to scope mount 10 by screws placed in screw holes 35. Removable rails 30 may enable the attachment of additional accessories for use in conjunction with scope 110. Examples of additional accessories that may be mounted on removable rails 30 include lasers, illuminators, levels, tactical lights and night vision equipment. As depicted in FIG. 1, removable rails 30 may be selectively placed in axial and/or radial orientations relative to scope 110. Removable rails 30 may be relatively short segments of MIL-STD-1913 rail, STANAG 2324 rail, or simply "Tactical Rail," alternatively known as a Picatinny rail. This type of Picatinny rail may be a mounting bracket used to provide a standardized mounting platform on firearms. Similar to scope mount 10, removable rails 30 may be manufactured of aircraft-grade aluminum or any other metal, alloy, amalgamation, plastic or substance known in the art. Removable rails 30 may be anodized and provided with a nonreflective finish. Screws placed in screw holes 35 may include oxide coated steel mounting screws.

FIG. 1 illustrates a number of components of scope mount 10 including rings 20, a scope mount base 50 and screws 55. Rings 20 may cover portions of scope 110 between objective bell 120 and turrets 140, and between turrets 140 and ocular bell 130. In an exemplary embodiment, rings 20 may surround the entire scope 110 between objective bell 120 and turrets 140, and the entire scope 110 between turrets 140 and ocular bell 130. Scope mount base 50 may at least partially define a portion of rings 20. Embedded in scope mount 50 may be a plurality of spare screws 55. Screws 55 may be of uniform or varying sizes. Screws 55 may include oxide coated steel mounting screws.

Figure 2:
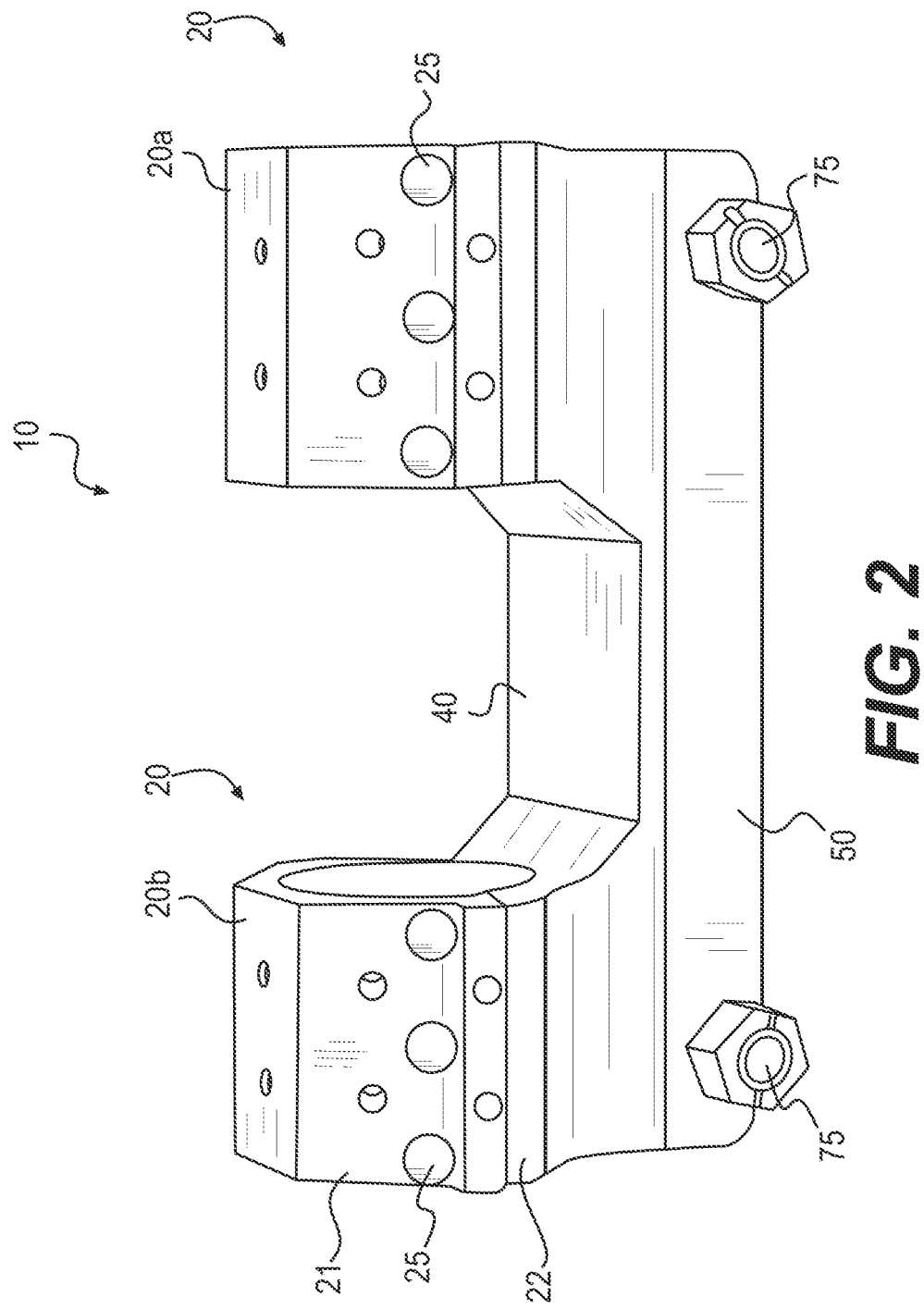
FIG. 2 is a diagrammatic illustration providing an alternate view of the exemplary disclosed scope mount of FIG. 1, sans scope.

FIG. 2 illustrates how rings 20 may include an upper ring component 21, a lower ring component 22, and rings 20a and 20b. Upper ring component 21 may be placed over the top of scope 110, and in alignment with lower ring component 22, so as to form a complete ring 20 surrounding scope 110. Rings 20 may be considered to include first and second ring components covering upper-half portions of scope 110. Rings 20 may further be considered to include third and fourth ring components covering lower-half portions of scope 110. The first and second ring components may attach to the third and fourth ring components, respectively, forming two rings circumspectly surrounding portions of scope 110. Rings 20 may include rings 20a and 20b. Rings 20a and 20b may include rings of varying sizes and dimensions. Ring 20a may cover a majority of scope 110 between turrets 140 and ocular bell 130. In an exemplary embodiment, ring 20a may include a diameter of about 1.0 to 3.5 inches. An axial dimension or length of ring 20a may be about 1.0 to 5.0 inches or about 1.0 to 1.5 times as long as a diameter of ring 20a. Ring 20b may cover a majority of scope 110 between turrets 140 and objective bell 120. In an exemplary embodiment, ring 20b may include a diameter of about 1.0 to 3.5 inches. An axial dimension or length of ring 20b may be about 1.0 to 4.0 inches or about 1.0 to 1.2 times as long as a diameter of ring 20b.

FIG. 2 further illustrates screw holes 25, base screws 75, and a leveling surface 40. Upper ring component 21 and lower ring component 22 may be attached by screws placed in screw holes 25. Screws placed in screw holes 25 may include oxide coated steel mounting screws. Scope mount base 50 may attach to a firearm via a mounting bracket. Base screws 75 may provide opportunity to tighten and/or release scope mount 10 from such a mounting bracket. Scope mount base 50 may also at least partially define scope leveling surface 40 between rings 20a and 20b. Scope leveling surface 40 may parallel the underside of scope 110 when scope 110 is placed in scope mount 10.

Figure 3:
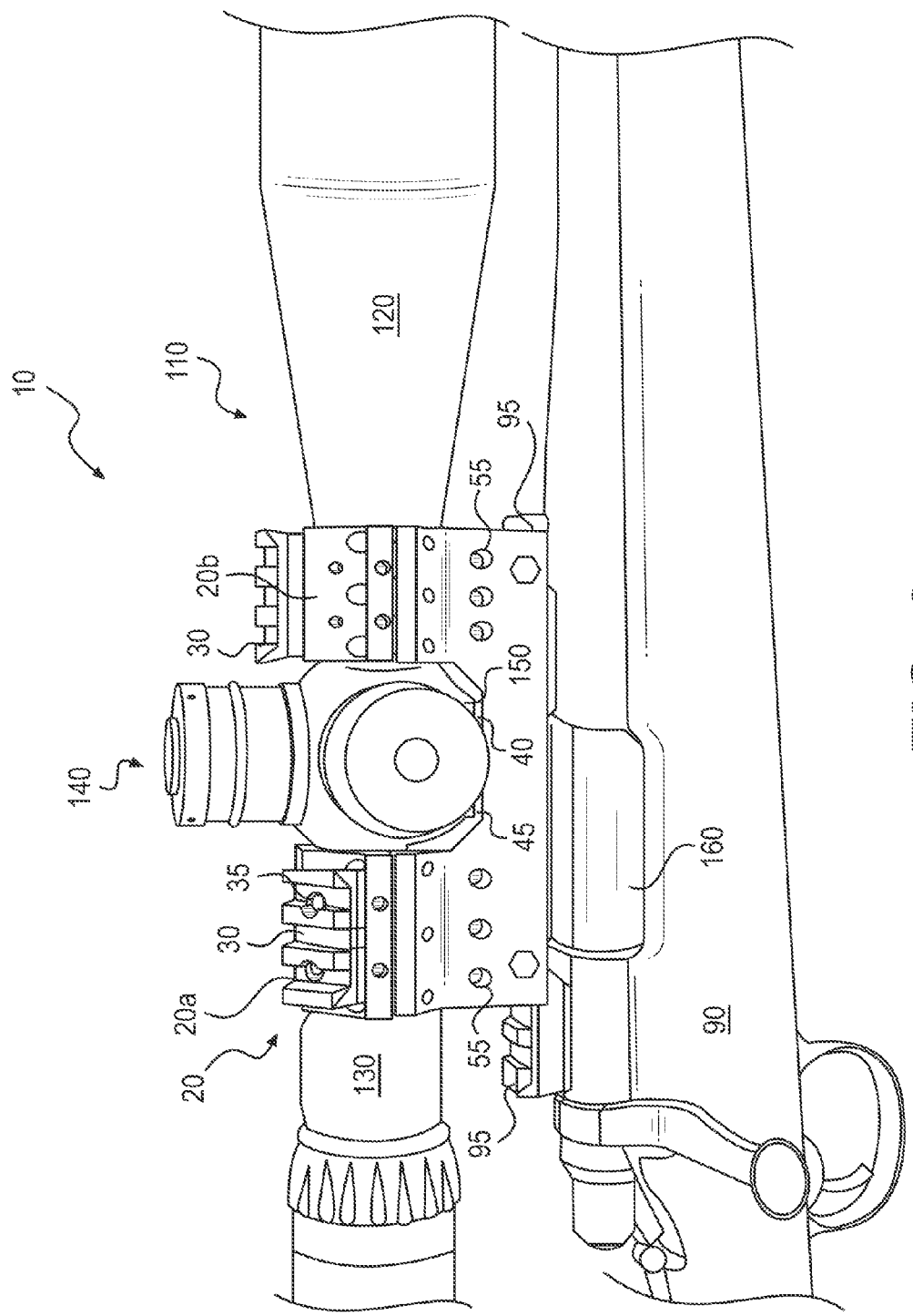
FIG. 3 is a diagrammatic illustration of the exemplary disclosed scope mount of FIG. 1 mounted to a firearm.

As shown in FIG. 3, upon mounting of scope 110 onto a firearm 90 via scope mount 10, a scope underside 150 may be brought into close proximity with scope leveling surface 40 of scope mount 10. Scope underside 150 may be level and may parallel scope leveling surface 40. A leveling space 45 may exist between scope underside 150 and scope leveling surface 40. Leveling space 45 may be of a fixed dimension all along scope leveling surface 40. Leveling space 45 may provide opportunity to level scope 110 within scope mount 10. A more detailed explanation of the procedure for leveling scope 110 within scope mount 10 follows with respect to FIG. 7.

Figure 4:
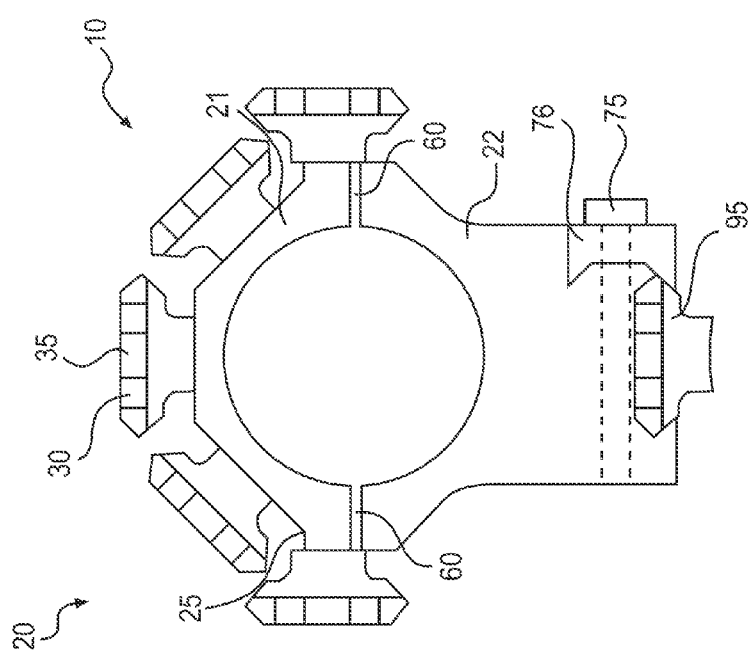
FIG. 4 is a cross-sectional illustration providing a frontview of the exemplary disclosed scope mount of FIG. 1 mounted to a Picatinny rail, sans scope.
Figure 5:
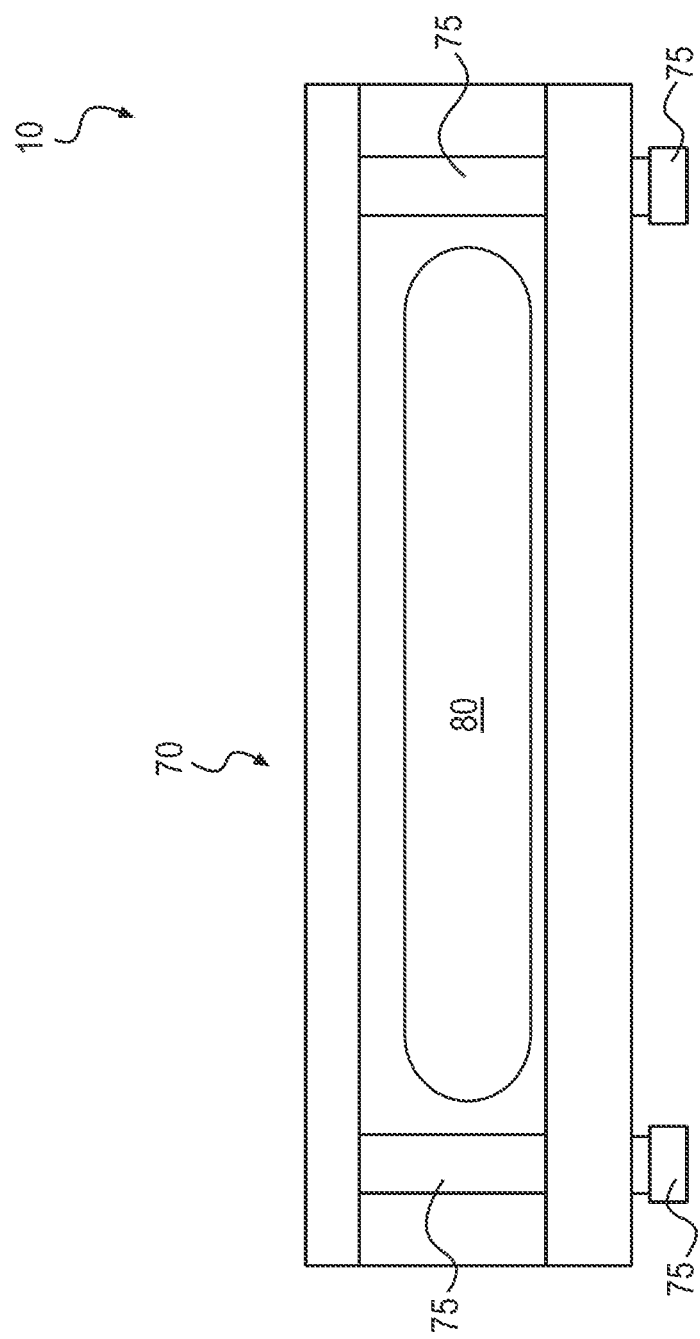
FIG. 5 is a diagrammatic illustration providing a bottomview of the exemplary disclosed scope mount of FIG. 1, sans scope and firearm.

As is also shown in FIG. 3, scope mount 10 may removably attach to a Picatinny rail 95 located on firearm 90. Similar to removable rails 30, Picatinny rail 95 may include a MIL-STD-1913 rail or STANAG 2324 rail. Picatinny rail 95 may extend either the full length or less than the full length of firearm 90. Scope mount 10 may attach to Picatinny rail 95 at any point along Picatinny rail 95. Scope mount 10 may removably attach to one or more portions of Picatinny rail 95 adjacent a loading and/or ejection port 160. In certain embodiments, scope mount 10 may mount over the top of, but not obstruct access to, loading and/or ejection port 160 and/or a bolt action associated with the firearm. As illustrated by FIG. 5, scope mount 10 may engage Picatinny rail 95 via a Picatinny rail engagement area 80 located on an underside of scope mount base 70. As shown in FIG. 5, Picatinny rail engagement area 80 may receive a portion of Picatinny rail 95, and scope mount 10 may be tightened to the received portion of Picatinny rail 95 via base screws 75. As shown in FIG. 4, base screws 75 may tighten the mount of scope mount base 50 onto Picatinny rail 95 by bringing a detachable portion 76 into a tight fit with Picatinny rail 95 and/or scope mount base 50. To dismount scope mount base 50 from Picatinny rail 95 base screws 75 may be loosened, and detachable portion 76 may then be detached and/or removed.

Alternatively, scope mount 10 may be configured to removably attach to any mounting platform known in the art. In addition to being configured to mount to a Picatinny rail, scope mount 10 may be configured to removably attach to any integrated rail system, and/or to any general or customized scope mounting system. In particular, scope mount base 70 may be configured to removably attach to any general or customized mounting platform known in the art.

As shown in the front, or down-the-barrel, view of FIG. 4, a ring space 60 exists between upper ring component 21 and lower ring component 22. The dimension of ring space 60 may or may not be equal to leveling space 45. In an exemplary embodiment, rings 20 may be formed by cutting solid rings into two halves, e.g., upper ring component 21 and lower ring component 22. The width of the cutting saw blade may be about 0.050 inches, creating a ring space 60 of about 0.050 inches. In the exemplary embodiment, leveling space 45 may be designed to also be about 0.050 inches. A leveling shim 65 (not shown in FIG. 4) that is about 0.050 inches wide may provide leveling assistance when utilized in leveling space 45 and/or ring space 60 during the mounting of scope 110 within scope mount 10. As previously noted, a more detailed explanation of the procedure for leveling scope 110 within scope mount 10 will follow in the description of Figure FIG. 7.

Alternatively, the ring components, or ring halves, of rings 20 may be oriented in a horizontal, vertical and/or any orientation relative to firearm 90. Rings 20 may be formed around scope 110 such that ring space 60 is parallel, perpendicular or situated in any orientation relative to scope leveling surface 40, and/or to firearm 90.

As is also shown in FIG. 4, removable rails 30 may be removably attached to scope mount 10 in a variety of orientations. A plurality of removable rails 30 may be utilized simultaneously or they may all be removed from scope mount 10. Screws for securing removable rails 30 through screw holes 35 may be manually tightened and loosened.

Figure 6:
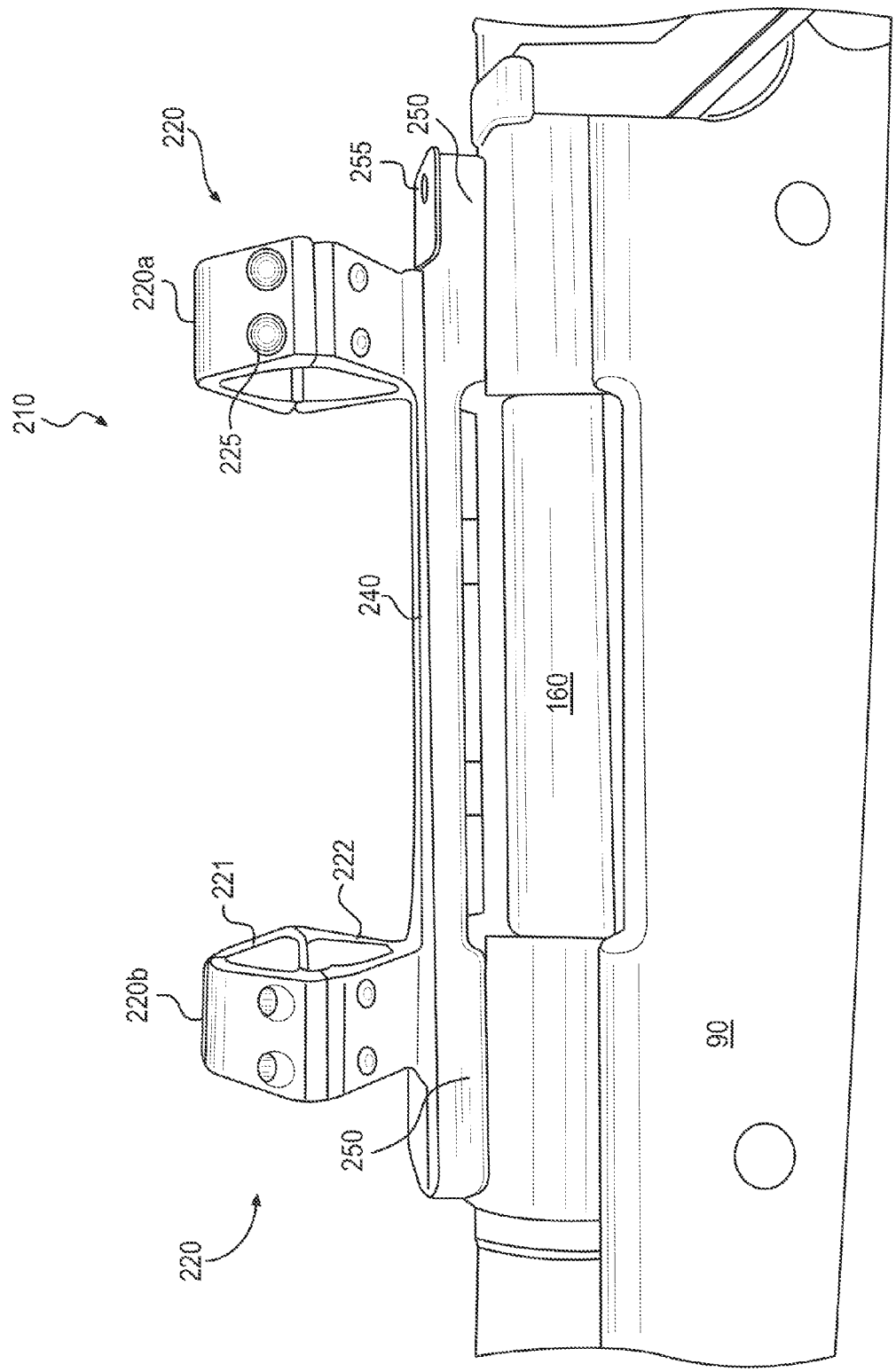
FIG. 6 is a diagrammatic illustration of an alternative exemplary disclosed scope mount attached to a firearm, sans scope.

FIG. 6 illustrates an alternate embodiment of a scope mount 210. FIG. 6 illustrates a number of the components of scope mount 210 including rings 220, a scope mount base 250 and screw holes 255. Rings 220 may surround portions of a scope. Scope mount base 250 may at least partially define a portion of rings 220. Scope mount 220 may be mounted directly to firearm 90 by screws placed in screw holes 255 in scope mount base 250 rather than by attachment to Picatinny rail 95. Scope mount base 250 may attach to one or more portions of firearm 90 adjacent loading and/or ejection port 160. In some embodiments, scope mount 220 may mount over the top of, but not obstruct access to, loading and/or ejection port 160. Scope mount 220 may attach to firearm 90 via a plurality of attachment points. As illustrated in FIG. 6, scope mount 220 may attach to firearm 90 via a plurality of attachment points surrounding loading and/or ejection port 160.

FIG. 6 also illustrates how rings 220 may include an upper ring component 221, a lower ring component 222, and rings 220a and 220b. Upper ring component 221 may be placed over the top of a scope, and in alignment with lower ring component 222, so as to form a complete ring 220 surrounding the scope. Rings 220 may be considered to include first and second ring components covering upper-half portions of scope 110. Rings 220 may further be considered to include third and fourth ring components covering lower-half portions of scope 110. The first and second ring components may attach to the third and fourth ring components, respectively, forming two rings surrounding portions of scope 110. Rings 220 may include rings 220a and 220b. Rings 220a and 220b may include rings of varying sizes and dimensions. In an exemplary embodiment, ring 220a may include a diameter of about 1.0 to 3.5 inches. An axial dimension or length of ring 220a may be about 1.0 to 5.0 inches or about 1.0 to 1.5 times as long as a diameter of ring 220a. In an exemplary embodiment, ring 220b may include a diameter of about 1.0 to 3.5 inches. An axial dimension or length of ring 220b may be about 1.0 to 4.0 inches or about 1.0 to 1.2 times as long as a diameter of ring 220b.

FIG. 6 further illustrates screw holes 225 and a leveling surface 240. Upper ring component 221 and lower ring component 222 may be attached by screws placed in screw holes 225. Screws placed in screw holes 225 and/or screw holes 255 may include oxide coated steel mounting screws. Scope mount base 250 may at least partially define scope leveling surface 240 between rings 220a and 220b. Scope leveling surface 240 may parallel the underside of a scope placed in scope mount 210.

The disclosed scope mount may be used with any firearm where a reduction in scope slippage is desired. In particular, the disclosed scope mount may be used when a higher degree of targeting accuracy is desired for firearms equipped with a scope. The disclosed scope mount may include rings 20, 220 which are designed to receive and surround portions of a scope 110. Rings 20, 220 may be tightened so as to achieve a tight fit around scope 110. Either before or after mounting scope mounts 10, 210 to firearm 90, scope 110 may be leveled onto scope mount 10, 210 in such a way that the reticules, or targeting features associated with the scope, are aligned with firearm 90. The procedure of leveling a scope within scope mount 10, 210 will now be explained.

Figure 7:
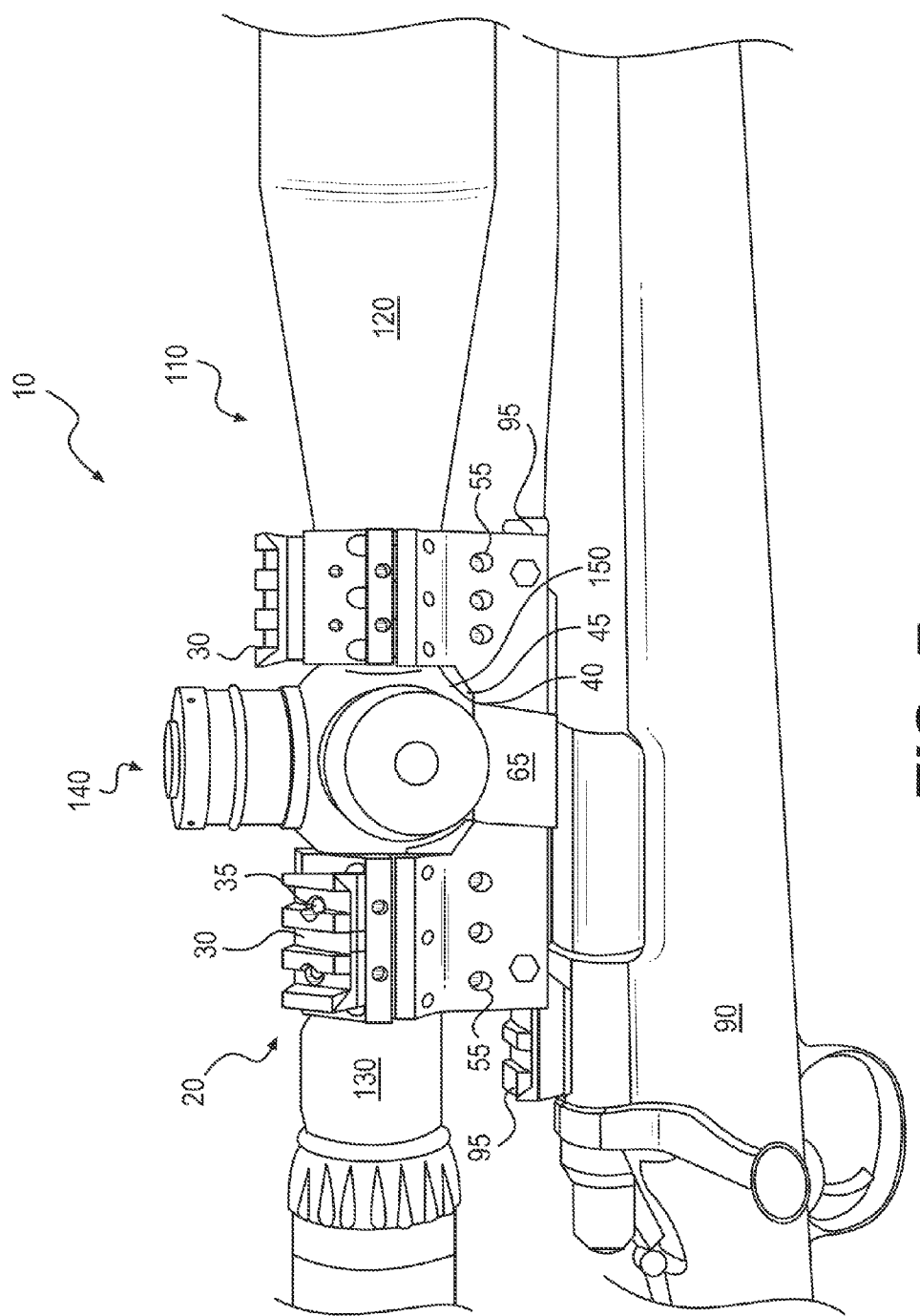
FIG. 7 is a diagrammatic illustration of a method of leveling a scope within the exemplary disclosed scope mount of FIG. 1.

As shown in FIG. 7, a leveling shim 65 may be utilized within leveling space 45 between scope leveling surface 40, 240 and scope underside 150. As described previously, in an exemplary embodiment, leveling shim 65 and leveling space 45 may each be about 0.050 inches in width. After initial placement of leveling shim 65 onto scope leveling surface 40, 240 scope 110 may be placed to rest upon leveling shim 65. At this point, leveling shim 65 levels scope 110 within scope mount 10, 210. Screws may be tightened slightly (not fully) in screw holes 25, 225. The screws are tightened to a point where, upon removal of leveling shim 65, scope 110 will not experience any wobble within scope mount 10, 210.

Figure 8:
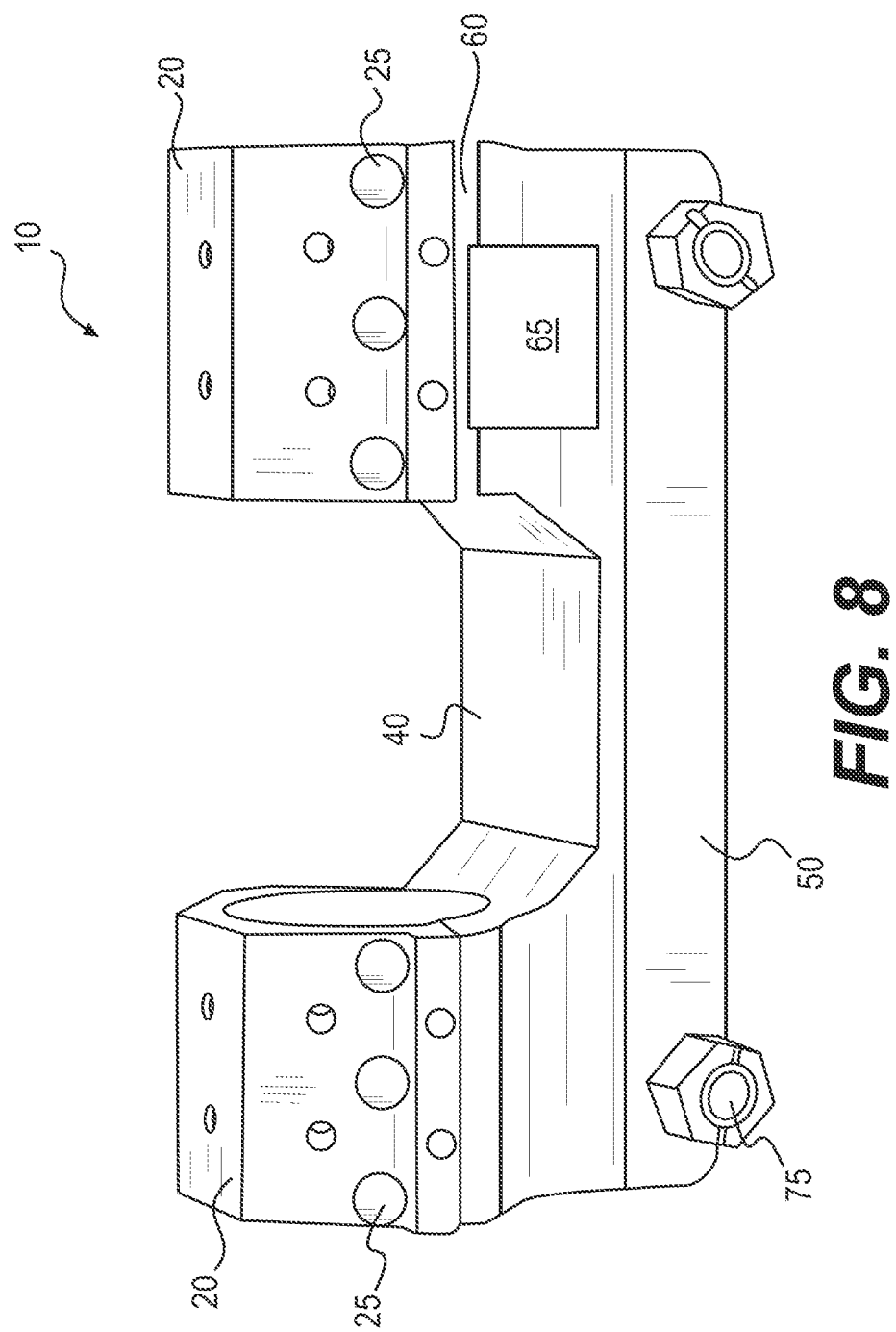
FIG. 8 is a diagrammatic illustration of a method of securing a scope to the exemplary disclosed scope mount of FIG. 1.

FIG. 8 illustrates an additional use of leveling shim 65 in leveling, and or mounting, scope 110 within scope mount 10, 210. After screws in screw holes 25, 225 have been sufficiently tightened so as to not allow wobble of scope 110, leveling shim 65 may be inserted into ring space 60. As described previously, in an exemplary embodiment, leveling shim 65 and ring space 60 may each be about 0.050 inches in width. After placement of leveling shim 65 into ring space 60, screws in screw holes 25, 225 may be tightened to the full extent allowed while leveling shim 65 is located in ring space 60. After the screws in screw holes 25, 225 have been tightened to the extent possible, leveling shim 65 may be removed from ring space 60, and the aforementioned screws may be tightened to the full extent possible. This process of utilizing leveling shim 65 during the tightening of the aforementioned screws may result in a more uniform tightening of rings 20, 220 around scope 110. To further accomplish a uniform tightening of rings 20, 220 around scope 110, the individual tightening the screws may do so in a cris-cross pattern so as to prevent one side of scope mount 10, 110 from closing significantly quicker than the other.

In addition to affording improved scope/scope mount stability, the disclosed scope mount provides its user the benefit of adjusting the equipment attached to scope mount 10, 210 in a relatively quick and efficient manner. Removable rails 30 enable firearm operators to lighten their load by removing removable rails 30 and/or any equipment attached thereto. If a situation arises where additional equipment is desired, for example night vision gear upon nightfall, the firearm operator is able to quickly attach the desired gear to removable rails 30. In this manner, removable rails 30 allow for efficient adaptation to changing conditions and circumstances a firearm operator may experience during a single mission when swapping out an entire firearm is not feasible. If during the addition or removal of removable rails 30 any screw is lost, spare screws 55 are available.

An additional benefit of the disclosed scope mount 10, 210 is that of pre-mounting. Scope mount 10, 210 may have scope 110 pre-mounted into it in such a manner that scope 110 is leveled with scope mount 10, 210, and is ready for a quick exchange if at any point a firearm operator requires a new scope. By having pre-mounted scope/scope mounts ready for use, firearm operators may swap out scope mounts rather than entire firearms and/or scopes when a scope needs to be replaced. Because leveling a scope may be a time consuming and tedious procedure, and given that transporting a spare pre-mounted firearm may not be feasible, for firearm operators who are either hunting or performing a military or law enforcement-related mission, this option of quickly replacing a compromised scope may afford significant benefit.

Given its relatively simple design and constitution, scope mount 10, 210 may be a reliable option for extended periods of time, requiring relatively little repair and maintenance. Additionally, given its lack of numerous complex mechanisms, scope mount 10, 210 is more likely to continue restricting scope slippage during rough handling and inclement conditions than a scope mount with more intricate parts.

It will be apparent to those skilled in the art that various modifications and variations can be made to the disclosed scope mount and method of leveling a scope without departing from the scope mount and the scope leveling and mounting methods of the disclosure. Other embodiments of the scope mount will be apparent to those skilled in the art from consideration of the specification and practice of the methods of leveling and mounting a scope disclosed herein. It is intended that the specification and examples be considered as exemplary only, with a true scope of the disclosure being indicated by the following claims and their equivalents.

What is claimed is:

1. A method of leveling a scope, the method comprising:
providing a leveling shim on a base of a scope mount;
placing a scope in the scope mount such that an underside of the scope rests on the leveling shim and portions of the scope rest on a first set of ring components;
providing a second set of ring components for placement on top of the scope;
securing the first set of ring components to the second set of ring components;
removing the leveling shim from the leveling surface;
inserting the leveling shim into a space between the first set of ring components and the second set of ring components; and
tightening screws until the first set of ring components and the second set of ring components surround the scope with a uniformly tight fit.

2. The method according to claim 1, wherein securing includes:
securing the first set of ring components to the second set of ring components using the screws; and
partially tightening the screws.

3. The method according to claim 2, wherein partially tightening includes tightening the screws until the scope does not wobble within the scope mount.

4. The method according to claim 1, wherein the leveling shim has a thickness about equal to a leveling space between the underside of the scope and a scope leveling surface of the base.

5. The method according to claim 4, wherein the leveling shim has a first width about equal to a second width of the leveling space.

6. The method according to claim 1, further including:
removing the leveling shim from the space; and
fully tightening the screws attaching the first and second set of ring components.

7. The method according to claim 1, wherein the leveling shim has a thickness of about 0.05 inches.

8. A method of leveling a scope, the method comprising:
providing a leveling shim on the base of a scope mount having a first lower ring component and a second lower ring component;
placing a scope in the scope mount such that an underside of the scope rests on the leveling shim and portions of the scope rest on the first lower ring component and the second lower ring component;
providing a first upper ring component for placement on top of the scope, the first upper ring component being aligned with the first lower ring component;
providing a second upper ring component for placement on top of the scope, the second upper ring component being aligned with the second lower ring component;
securing the first upper ring component to the first lower ring component with a first screw;
securing the second upper ring component to the second lower ring component with a second screw;
removing the leveling shim from the leveling surface;
inserting the leveling shim into a first space between the first upper ring component and the first lower ring component; and
tightening the first and second screws until the first upper ring component and the first lower ring component surround the scope with a uniformly tight fit.

9. The method of claim 8, further including:
securing the first upper ring component to the first lower ring component with the first screw on a first side of the scope;
securing the second upper ring component to the second lower ring component with the second screw on the first side;
securing the first upper ring component to the first lower ring component with a third screw on a second side of the scope opposite the first side; and
securing the second upper ring component to the second lower ring component with a fourth screw on the second side.

10. The method according to claim 9, wherein the steps of securing include partially tightening the first, second, third, and fourth screws.

11. The method according to claim 10, wherein partially tightening further includes tightening the first, second, third, and fourth screws in a cris-cross pattern.

12. The method according to claim 11, wherein the cris-cross pattern includes;
partially tightening the first screw;
partially tightening the fourth screw after partially tightening the first screw;
partially tightening the second screw after partially tightening the fourth screw; and
partially tightening the third screw after partially tightening the second screw.

13. The method according to claim 12, wherein partially tightening includes tightening the first, second, third, and fourth screws until the scope does not wobble within the scope mount.

14. The method according to claim 8, further including:
removing the leveling shim from the first space;
inserting the leveling shim into a second space between the second upper ring component and the second lower ring component; and
tightening the second and fourth screws until the second upper ring component and the second lower ring component surround the scope with the uniformly tight fit.

15. The method according to claim 14, further including:
removing the leveling shim from the second space; and
fully tightening the first, second, third, and fourth screws.

16. The method according to claim 10, wherein the leveling shim is a first leveling shim, and the method further includes:
removing the first leveling shim from the leveling surface;
inserting the first leveling shim into a first space between the first upper ring component and the first lower ring component;
inserting a second leveling shim into a second space between the second upper ring component and the second lower ring component; and
tightening the first, second, third, and fourth screws.

17. The method according to claim 16, further including:
removing the first leveling shim and the second leveling shim; and
fully tightening the first, second, third, and fourth screws.

18. The method according to claim 17, wherein
the first leveling shim is about 0.05 inches thick; and
the second leveling shim is about 0.05 inches thick.

* * * * *